(12) United States Patent
Fu

(10) Patent No.: US 9,258,288 B2
(45) Date of Patent: *Feb. 9, 2016

(54) METHOD AND APPARATUS FOR PROVIDING ENHANCED SERVICE AUTHORIZATION

(71) Applicant: Nokia Technologies Oy, Espoo (FI)

(72) Inventor: Yan Fu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/741,033

(22) Filed: Jan. 14, 2013

(65) Prior Publication Data

US 2013/0145435 A1 Jun. 6, 2013

Related U.S. Application Data

(63) Continuation of application No. 12/388,326, filed on Feb. 18, 2009, now Pat. No. 8,364,970.

(51) Int. Cl.
*G06F 21/00* (2013.01)
*H04L 29/06* (2006.01)
*G06F 21/62* (2013.01)

(52) U.S. Cl.
CPC ............ *H04L 63/08* (2013.01); *G06F 21/6218* (2013.01); *H04L 63/0807* (2013.01)

(58) Field of Classification Search
CPC ............................ H04L 63/08; H04L 63/0807
USPC ........................................................ 713/185
See application file for complete search history.

(56) References Cited

U.S. PATENT DOCUMENTS

| 6,073,241 | A | * | 6/2000 | Rosenberg et al. ............... 726/3 |
| 6,535,917 | B1 | * | 3/2003 | Zamanzadeh et al. ......... 709/225 |
| 6,928,545 | B1 | * | 8/2005 | Litai et al. ..................... 713/185 |
| 8,364,970 | B2 | * | 1/2013 | Fu ................................. 713/185 |
| 2002/0147929 | A1 | * | 10/2002 | Rose ............................. 713/201 |
| 2003/0233554 | A1 | * | 12/2003 | Litai et al. ..................... 713/182 |
| 2004/0187031 | A1 | | 9/2004 | Liddle |
| 2004/0193920 | A1 | | 9/2004 | Kiss et al. |
| 2005/0108575 | A1 | | 5/2005 | Yung |
| 2006/0095768 | A1 | * | 5/2006 | Hoshino et al. ............... 713/168 |
| 2006/0218628 | A1 | | 9/2006 | Hinton et al. |
| 2007/0073880 | A1 | | 3/2007 | Krishnakumar et al. |
| 2007/0289006 | A1 | * | 12/2007 | Ramachandran et al. ...... 726/10 |
| 2008/0229107 | A1 | * | 9/2008 | Nakhjiri et al. ............... 713/172 |
| 2009/0037736 | A1 | | 2/2009 | Djordjrvic et al. |
| 2009/0119763 | A1 | | 5/2009 | Park et al. |

FOREIGN PATENT DOCUMENTS

| WO | 2008-025835 A1 | 3/2008 |
| WO | 2008-099420 A1 | 8/2008 |

* cited by examiner

*Primary Examiner* — Teshome Hailu
(74) *Attorney, Agent, or Firm* — Ditthavong & Steiner, P.C.

(57) ABSTRACT

An approach is provided for authorizing one or more services from service providers in a communications network. The approach includes receiving a request from a first service provider, the request having an associated primary token and a secondary token identifier, the secondary token identifier relating to resources of a second service provider. Based, at least in part, on the secondary token identifier, a secondary token is identified; and then the secondary token is sent to the first service provider, wherein the first service provider and the second service provider belong to different trust domains and the first service provider can use the secondary token to access resources of the second service provider.

20 Claims, 10 Drawing Sheets

METHOD AND APPARATUS FOR PROVIDING ENHANCED SERVICE AUTHORIZATION

CROSS-REFERENCE TO RELATED APPLICATIONS

This application is a continuation of prior application Ser. No. 12/388,326 filed Feb. 18, 2009, which is herein incorporated by reference in its entirety.

BACKGROUND

Internet services providers are continuing to expand the breadth of internet services available to consumers. These services, such as, for example, printing services and photo-storing services, allow consumers to share and manipulate data across the internet without the need for specialized clients and applications on their own systems. Thus, user devices that are smaller in size and that use less computing resources may still accomplish complicated tasks. In addition to simply providing different services, communication and interaction between different service providers are proving beneficial as well. However, traditional systems do not permit the efficient interaction, if at all, of the varied services.

SOME EXEMPLARY EMBODIMENTS

Therefore, there is a need for an approach for providing user authorization between service providers belonging to different trust domains.

According to one embodiment, a method of authorizing one or more services includes receiving a request from a first service provider, the request having an associated primary token and a secondary token identifier, the secondary token identifier relating to resources of a second service provider. Then, in accordance with this method, based, at least in part, on the secondary token identifier, identifying a secondary token; and sending the secondary token to the first service provider, wherein the first service provider and the second service provider belong to different trust domains.

According to another embodiment a service authorization system includes a processor configured to execute instructions stored in a memory. This system also includes a receiver configured to receive a request from a first service provider, the request having an associated primary token and a secondary token identifier, the secondary token identifier relating to resources of a second service provider; determination circuitry under control of the process configured to identify a secondary token based, at least in part, on the secondary token identifier; and a transmitter configured to send the secondary token to the first service provider, wherein the first service provider and the second service provider belong to different trust domains.

According to another embodiment, an apparatus including a processor and a memory storing executable instructions that if executed cause the apparatus to at least perform the following determining that a request is received from a first service provider, the request having an associated primary token and a secondary token identifier, the secondary token identifier relating to resources of a second service provider; based on the secondary token identifier, identifying a secondary token; and initiating sending of the secondary token to the first service provider, wherein the first service provider and the second service provider belong to different trust domains.

According to yet another embodiment, a method of providing services includes receiving at a first service provider a request relating to accessing resources of a second service provider, the request associated with a primary token. Then, in accordance with this method, requesting from an authorization system a secondary token, the secondary token based at least in part on the second service provider and the primary token; receiving the secondary token from the authorization system; and requesting from the second service provider access to the resources of the second service provider using the secondary token, wherein the first service provider and the second service provider belong to different trust domains.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENT

A method and apparatus for authorizing services between service providers belonging to different trust domains are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although certain embodiments of the invention are discussed with respect to service providers involving printing services, file sharing services, and photo-storing services, it is recognized by one of ordinary skill in the art that the exemplary embodiments of the inventions have applicability to any type of network-connected service provider. In the description that follows, the term "primary identity token" is frequently shortened to "primary token" for purposes of readability but both terms are interchangeable in meaning.

Figure 1:
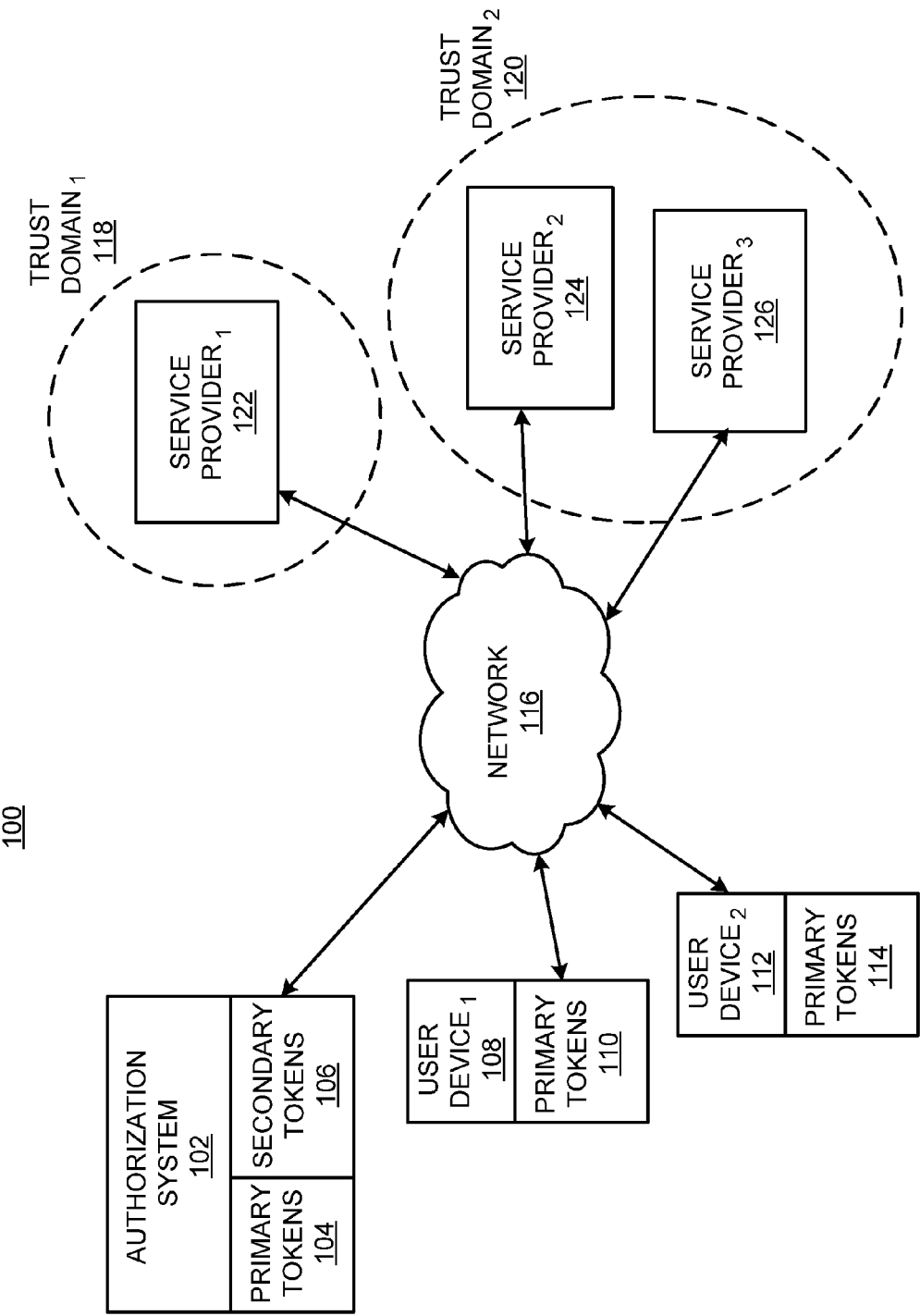
FIG. 1 is diagram of a communications system that can be used to implement an embodiment of the invention.

FIG. 1 is diagram of a communications system that can be used to implement an embodiment of the invention. Under this scenario, multiple service providers 122, 124, 126 supply services to multiple user devices 108, 112. In one embodiment, user device 108 includes a user interface or an application that allows the user to connect through the network 116 to the service providers 122, 124, 126. Also, as shown, the service providers 122, 124, 126 may belong to different trust domains 118, 120. While only two user devices 108, 112, two trust domains 118, 120, and three service providers 122, 124, 126 are explicitly shown, one of ordinary skill will recognize that these numbers are only examples and that more or less of each entity and device may be contemplated in other embodiments.

As mentioned, traditional approaches do not readily support the interaction of different service providers. For example, if a user would like to use a printing service to print photos that are being stored within a photo-storing storing service, one approach might be to require the user to first login in to the photo-storing service and download desired photos to their client application. The user would then need to login to the printing service and upload the photos to be printed. Because this approach is tedious and time consuming, various techniques have been proposed to address some of the disadvantages.

Another approach is to require all the service providers to be within the same trust domain. This means that each service provider trusts the same identity manager for authenticating users and for allowing only authorized activity of these users. One disadvantage of such an approach is that each service provider has substantially all privileges to access a user's resources on another service provider.

Yet another approach has been the introduction of a signaling protocol (e.g., OAuth) that relays numerous messages between a client application on a user's computer and different service providers in an effort to permit one service provider to access another service provider. However, some of the disadvantages of the OAuth protocol include requiring specific client-type applications and using multiple round-trip messages between the user's computer and the service providers. While these disadvantages exist for any environment, they are particularly noticeable in a wireless environment.

By contrast to the above traditional approaches, the system 100 utilizes a service authorization mechanism to permit the use of multiple services. The authorization system 102 acts, in an exemplary embodiment, as an identity manager and may store a primary identity token 104 for a user of the user device 108. The primary identity token 104 allows a service provider 122 to authenticate and authorize a user to access some resource of the service provider. The resource access may, for example, be to "read a file", to "print a file", to write, edit, or delete a file. According to at least some embodiments, different primary identity tokens 104 allow different users different permissions or privileges to resources of a service provider (e.g., 122, 124, 126).

In operation, the user device 108 may also include one or more primary tokens 110 as well. Similarly, another user device 112 may include its own primary tokens 114 as well. The user device's primary tokens, for example 110, may be stored on the device 108 or, alternatively, a user interface on the device may allow the user to enter their primary token as needed. In one embodiment, the user inputs a username, password and optionally a trust domain or a service provider on authorization system 102; and if valid, the system 102 returns a primary token. If no trust domain or service provider is provided, the 102 authorization system may return a set of primary tokens, each corresponding to a different trust domain. Whether entered by the user or retrieved from storage, the user device 108 forwards a primary identity token 110 to a service provider (e.g., 122) when accessing that service provider. The service provider 122 authenticates that user's token with an authorization system 102. Assuming the authentication system 102 and the service provider 122 are in the same trust domain, the reply from the authorization system 102 causes the service provider 122 to either permit or deny the access requested by the user device 108. It is noted that service providers in different trust domains rely on the authentication system 102 as a trusted system.

In the above description, the service provider 122 and the authorization system 102 are assumed to be within the same trust domain 118. However, there may be instances in which access to service providers 124, 126 in a different trust domain 120 is desired. As explained in more detail later, some embodiments of the present invention utilize secondary tokens 106 to allow such access across trust domains.

Figure 2:
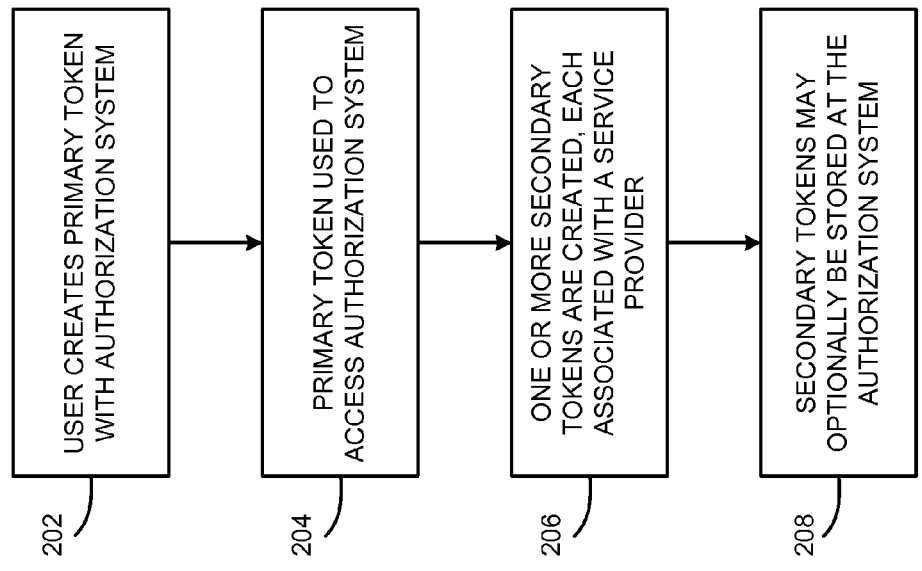
FIG. 2 is a flowchart of a process for creating primary and secondary tokens that can be used to implement an embodiment of the invention.

FIG. 2 is a flowchart of a process for creating primary and secondary tokens that can be used to implement an embodiment of the invention. Initially, in step 202, a user creates their primary identity token with the authorization system. This primary token may, for example, be a username and password; however in different embodiments, other information may be included as well. Once the primary token exists, then, in step 204, it may be used to access the authorization system to perform various account activities related to the user and the authorization system. For example, in step 206, the user may create one or more secondary tokens that are associated with their primary token.

A secondary token relates to what type of access and privileges the user allows one service provider who desires to access resources of a different service provider. For example, using the photo-storing and printing services mentioned earlier. The printing service provider may be in the same trust domain as the authorization system. Thus, between the user and the printing service, the primary identity token is used to determine access and privileges. However, the photo-storing service provider may belong to a different trust domain. Thus, the secondary tokens are created by the user to define what type of access and privileges the printing service provider has with regard to the user's resources on the photo-storing service. For example, one secondary token may allow the printing service to read any files in a particular directory, thereby allowing them to be retrieved and printed. Another secondary token may only allow access to certain files in another directory. These directories may for example be Uniform Resource Locators (URLs) or some other type of identifier.

It is contemplated that any particular format or structure of a secondary token can used. Each service provider (e.g., 124, 126) may have its own format or may share a common standard format. However, one beneficial structure for a secondary token is to include both a "name" and a "value". Thus, the authorization system 102 may search for a secondary token by "name" and then present the "value" in a message of some type. As for the "value" of a secondary token, this may also vary according to each service provider based on the granularity of how each service provider grants access and privileges to the resources it provides service for and the types of services being provided. Some service providers may grant access based on time, based on group membership, or based on individual identity. Also some service providers may grant access at the directory (or folder) level while others grant access at the individual file level. Thus in at least some embodiments, the users and the service providers decide what types of resource access and privileges will be definable, while the authorization system behaves more as a storehouse of this information which it provides upon request.

While it is contemplated that some secondary tokens may be created on-the-fly (i.e., dynamically) while a user is interacting with both the authorization system 102 and a service provider (e.g., 122), it is also contemplated, in step 208, that the secondary tokens 106 may be stored on the authorization system 102 as well. Thus, each primary token 104 may be have a respective secondary token 106 stored on the system 102.

Figure 3:
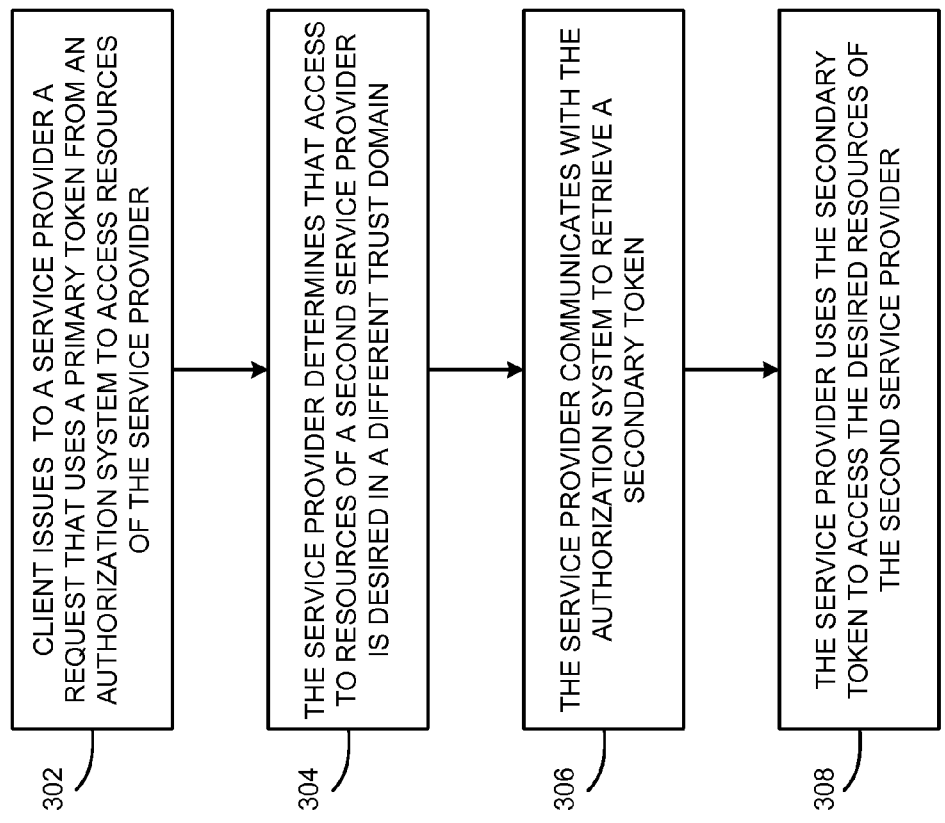
FIG. 3 is a flowchart of a process for accessing a service provider using primary and secondary tokens that can be used to implement an embodiment of the invention.

FIG. 3 is a flowchart of a process for accessing a service provider using primary and secondary tokens that can be used to implement an embodiment of the invention. For purposes of clarity, the process of FIG. 3 will be described with reference to a printing service provider and photo-storing service provider already introduced. As mentioned earlier, these two type of services providers are mentioned only be way of example and other types of service providers are contemplated as well.

In step 302, the client (through an application on their device) issues a request to the printing service provider. The printing service provider and the authorization system are in the same trust domain so the request includes the user's primary identity token. Within the request, the printing service provider, in step 304, determines that access to resources of the photo-storing service provider are desired. For example, the user may have requested printing of three photos currently being shared. As a result, the printing service provider may request access to these three photos and receive a response back from the photo-storing service provider regarding what type of secondary token allows the requested access. Alternatively, the initial request may include both the primary token and the name of an appropriate secondary token.

Regardless of whether the identity of an appropriate secondary token is included in the user's initial request or identified through communication with the photo-storing service provider, the printing service provider communicates, in step 306, with the authorization system to retrieve the secondary token. For example, the printing service provider may send the primary token and a secondary token identifier to the authorization system. Based on that data, at least in part, the authorization system returns the appropriate secondary token to the printing service provider. Using the secondary token, the printing service provider can then access the desired photos from the photo-storing service provider, in step 308 even though they are in different trust domains.

Figure 4:
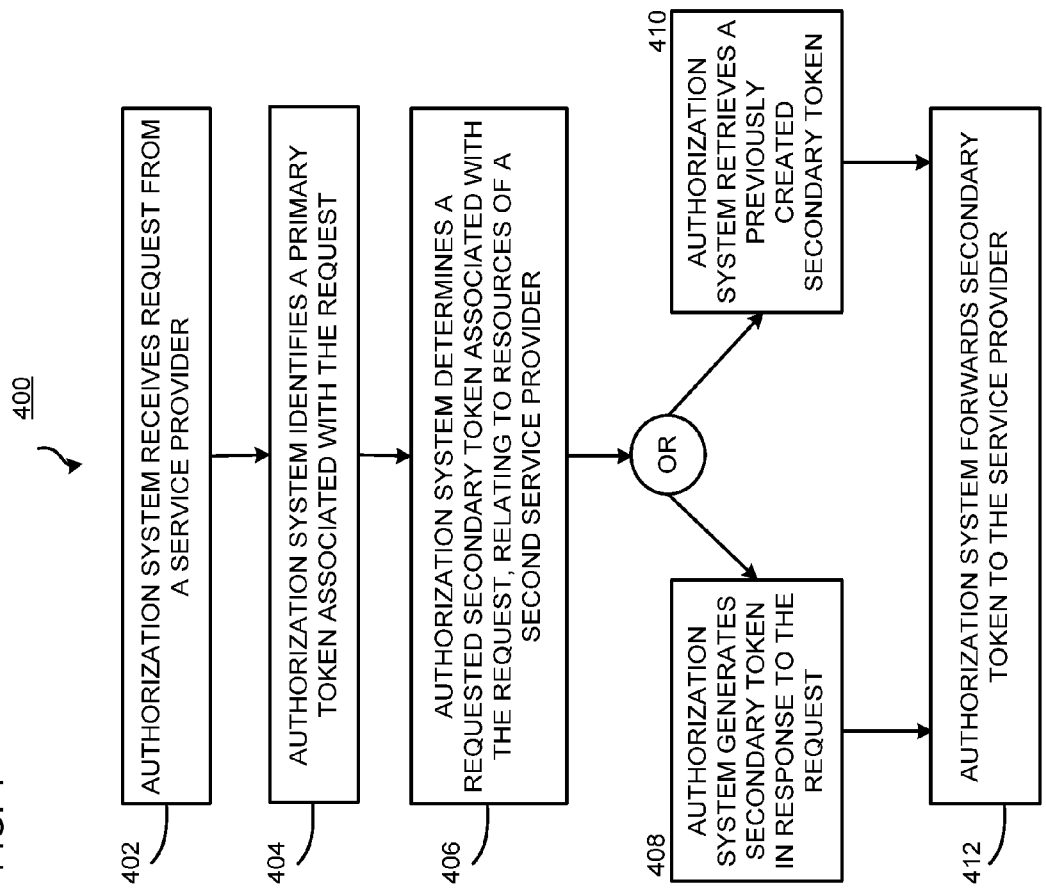
FIG. 4 is a flowchart of a process for authorizing a user with primary and secondary tokens that can be used to implement an embodiment of the invention.

FIG. 4 is a flowchart of a process for authorizing a user with primary and secondary tokens that can be used to implement an embodiment of the invention. In step 402, the authorization system receives a request for a secondary token from a first service provider within its trust domain. In steps 404 and 406, the authorization system processes the request to determine a primary token and a desired secondary token. As a result, the authorization system may separately communicate with the user or other entity to generate the desired secondary token in step 408, or retrieve the desired secondary token from memory in step 410. Next, in step 412, the authorization system forwards the secondary token to the requesting service provider so that the requesting service provider will be able to access resources on a second, separate service provider in a different trust domain.

Figure 5:
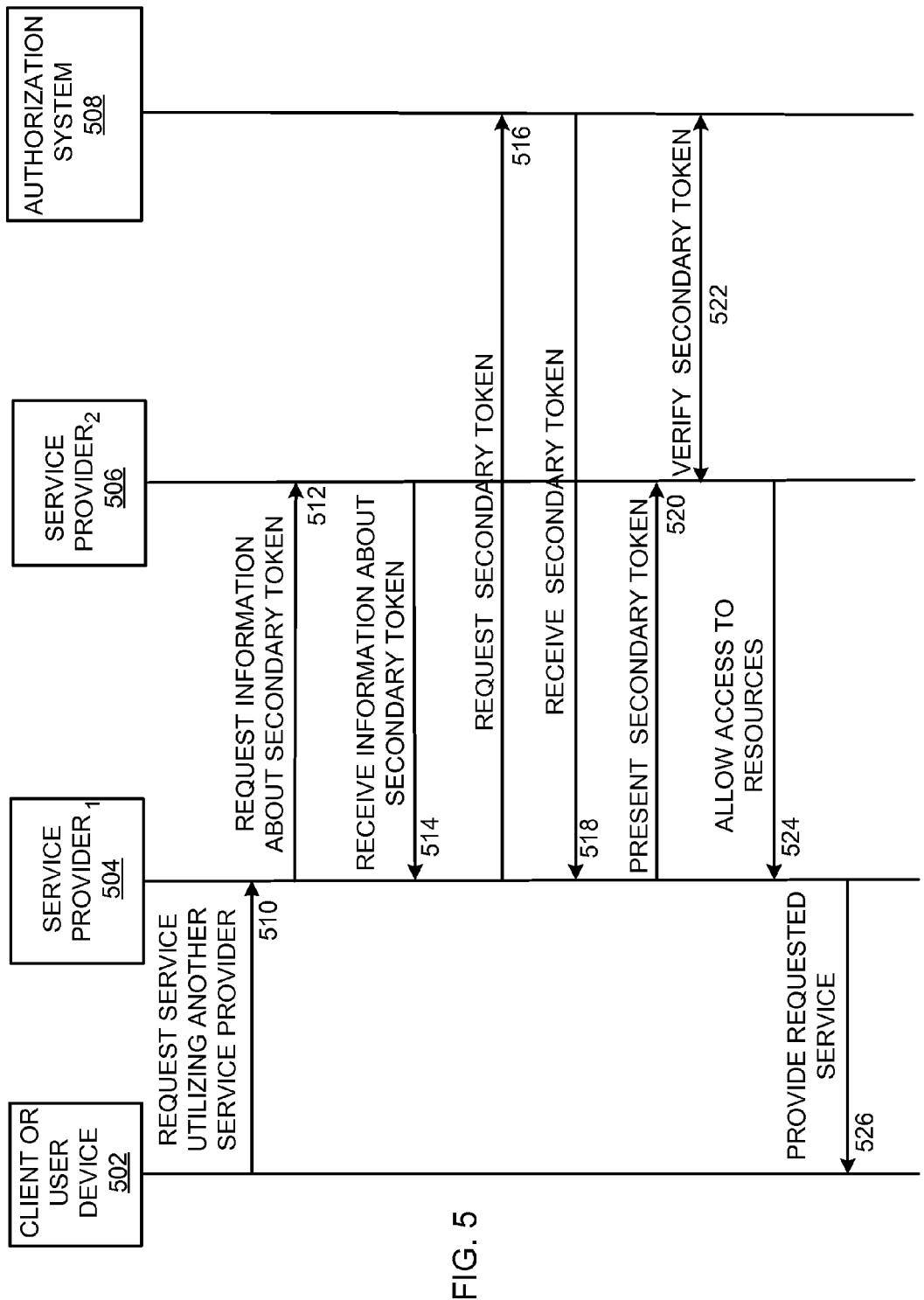
FIG. 5 is a signaling diagram of a protocol that can be used to implement an embodiment of the invention.

FIG. 5 is a signaling diagram of a protocol that can be used to implement an embodiment of the invention. The participating entities in the protocol of FIG. 5 include a client, or user, device 502, one service provider 504, another service provider 506, and an authorization system 508. The user, through an application on the user device, requests (step 510) service from the first service provider 504 that requires access to the other service provider 506. According to some embodiments, the first service provider 504 requests (step 512) from the second service provider 506 information about a secondary token. It is contemplated that the second service provider can publish some well-known secondary token identifiers, e.g., "all-photos-read-only"; as such, step 512 could be omitted. In response, the second service provider 506 sends (step 514) identifying information about the secondary token back to the first service provider 504.

Now, the first service provider 504 requests (step 516) from the authorization system 508 the appropriate secondary token and receives (step 518) the secondary token in reply. The first service provider 540 may then present (step 520) the secondary token to the second service provider 506. In some embodiments, there may be an optional message (step 522) in which the second service provider 506 verifies the secondary token with the authorization system 508. Based on the presentation of a valid secondary token by the first service provider 504, the second service provider 506 allows (step 524) the first service provider 504 access to the requested resources. In turn, the first service provider 504 fulfills (step 526) the service requested by the user device 502.

One benefit of the of signaling protocol depicted in FIG. 5 is that there is only one round trip communication between the user device 502 and the first service provider 504. The communication links between the other parties may be high speed, highly available, high reliability links allowing for fast and efficient communication of the bulk of the signaling protocol. In some embodiments, the initial link between the user device 502 and the first service provider 504 may be a wireless or cellular connection with comparatively low speed or reliability; thus minimizing the round trip messages on this initial link provides benefits in speed and message efficiency.

Figure 6:
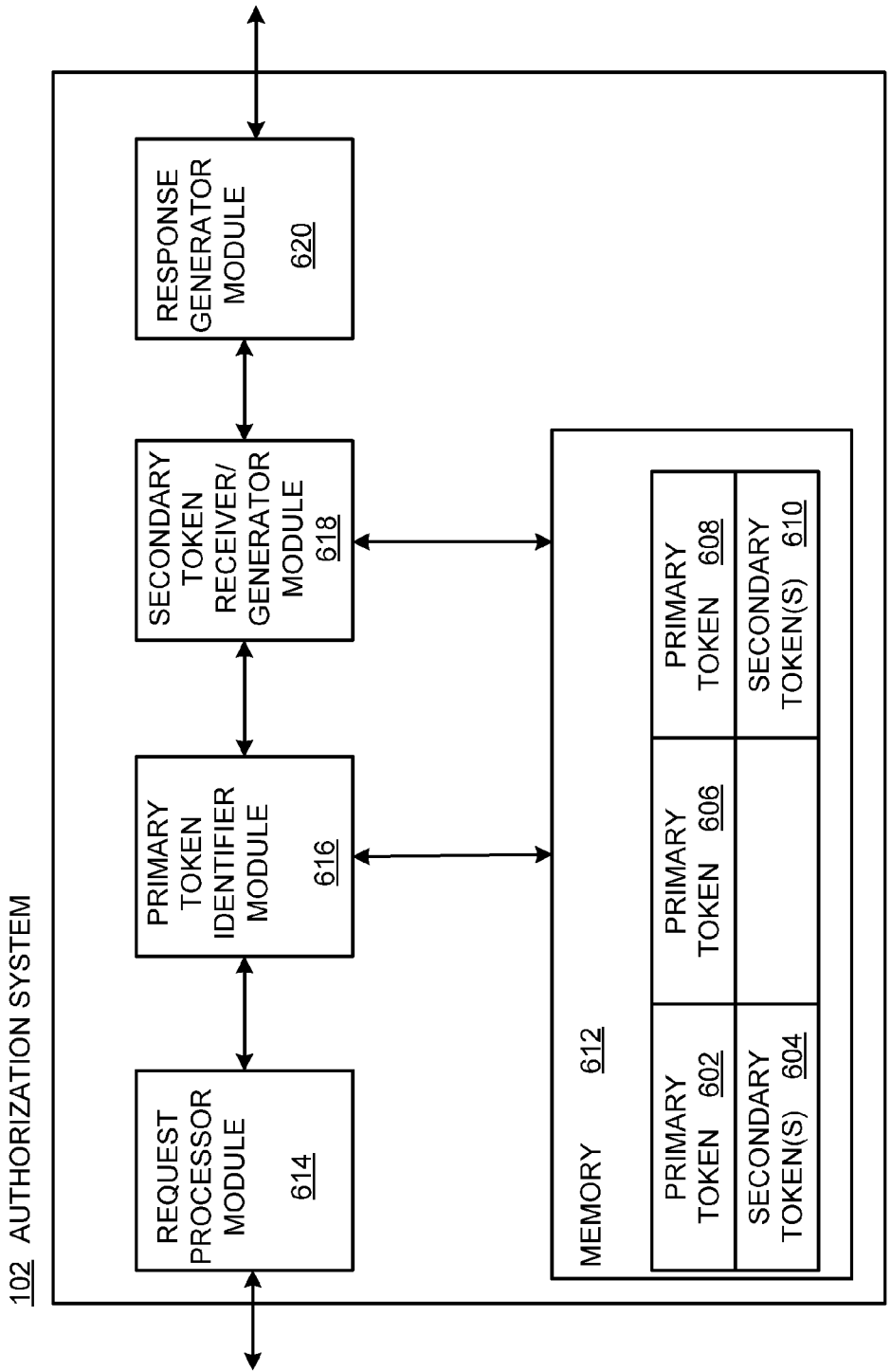
FIG. 6 is a diagram of components of an authorization system that can be used to implement an embodiment of the invention.

FIG. 6 is a diagram of components of an authorization system that can be used to implement an embodiment of the invention; the system may include other components as well but that are not shown for purposes of clarity. The authorization system 102 of FIG. 6 includes a number of modules to perform its various functions. These modules may be separate hardware circuitry but also may be performed by a processor executing software, or a combination of both. The memory 612 of the authorization system 102 includes primary identity tokens 602, 606, 608 and associated with at least some of these primary tokens are respective secondary tokens 604, 610.

The authorization system 102 includes a request processor module 614 configured to process requests received from service providers. As part of the request processing, this module 614 can organize the information within the request in a format and structure appropriate for subsequent modules. The authorization system 102 also includes a module 616 configured to identify a primary token associated with the request and another module 618 configured to identify or generate a secondary token based on the request. For example, this module 618 may identify a secondary token based, at least in part, on the primary token identified by module 616 and some type of token name or identifier included in the request. These two modules 616 and 618 complement the operation of one another so that an appropriate secondary token is retrieved from the memory 612. The response generator module 620 organizes and formats the information about the secondary token to allow a transmitter or other interface to communicate the information to the service provider which sent the request.

Figure 7:
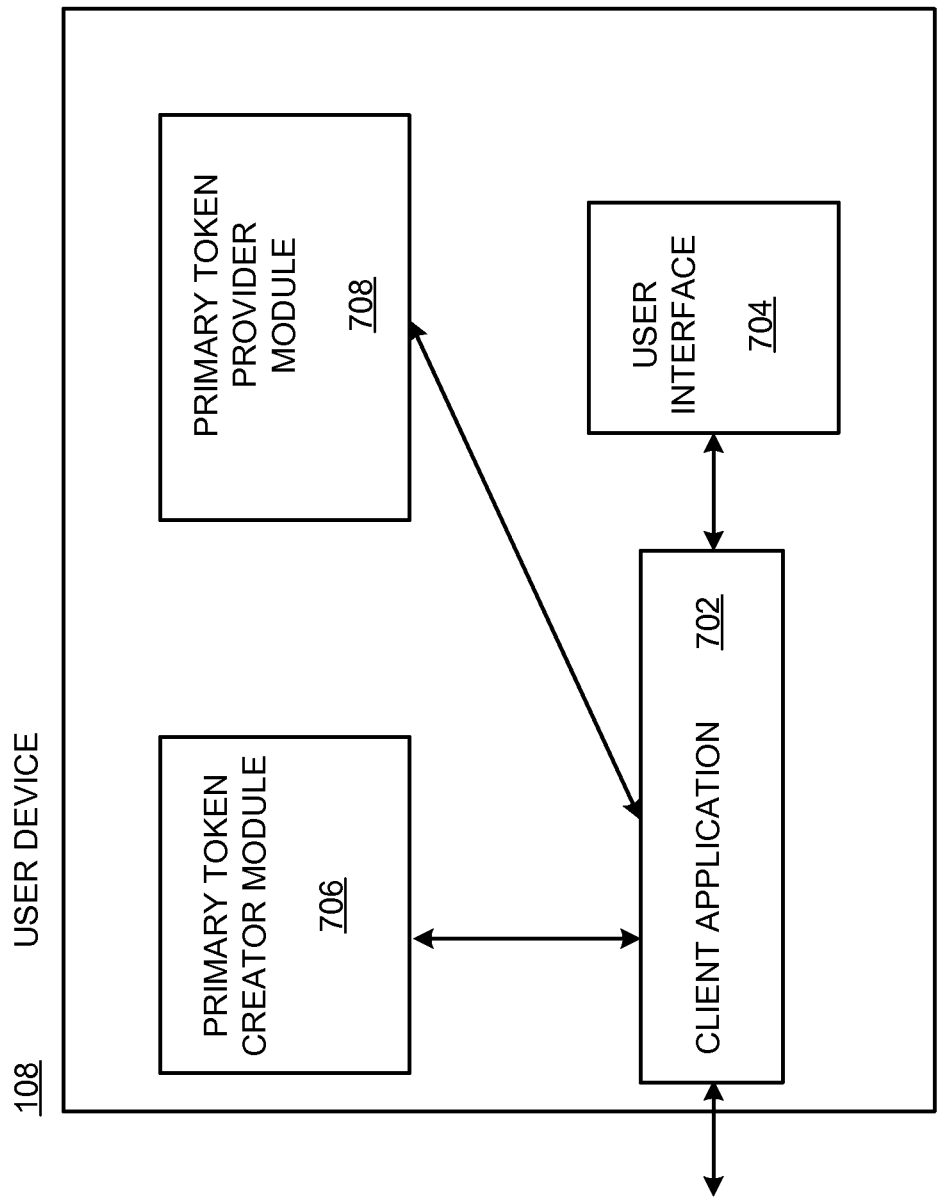
FIG. 7 is a diagram of components of a user device that can be used to implement an embodiment of the invention.

FIG. 7 is a diagram of components of a user device that can be used to implement an embodiment of the invention. The user device 108 may, according to some embodiments, comprise a wireless or portable handset, or similar device; while some embodiments also contemplate more traditional computing platforms coupled with wired or wireless networking infrastructure.

The user device 108 includes a client application 702 that interprets and organizes information and messages in such a way that they can be received from or transmitted to a connected network. One example client application 702 is a web browser that communicates with various web servers and services. Only one client application 702 is shown; however, in some embodiments the user device 108 my have multiple client applications that may run individually or concurrently. The user device 108 also includes a user interface 704 that may be separate from or partly integrated within the client application 702. In some embodiments the user interface 704 includes hardware circuitry such as buttons, pointing devices, and display screens and also software processes that allow communication between such hardware circuitry and a client application 702.

According to at least some embodiments, the user device 108 is used to create a primary identity token with an identity manager (such as the authorization system described herein.) The primary token is utilized within a trust domain to allow the user access and privileges relating to resources within that trust domain. Thus, the user device 108 may include a module 706 configured to create a primary token. Typically, this module 706 would utilize services of the client application 702 to communicate in an appropriate format with the authorization system.

The user device 108 also includes a primary token provider module 708 that is configured to provide primary tokens that have already been created. When requesting access to different service providers or the authorization system, the user device 108 will, in some embodiments, provide a primary identity token as part of that access. For example, the client application 702 may display a login screen in which the user can enter the primary token or the client application 702 may display a list of available primary tokens from which the user can select an appropriate choice. Through the interaction of the user and this module 708, the user device 108 provides a primary token, possibly encrypted by the module 708, that can be communicated to a service provider, authorization system, or other system.

The processes described herein for authorizing services between service providers belonging to different trust domains may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
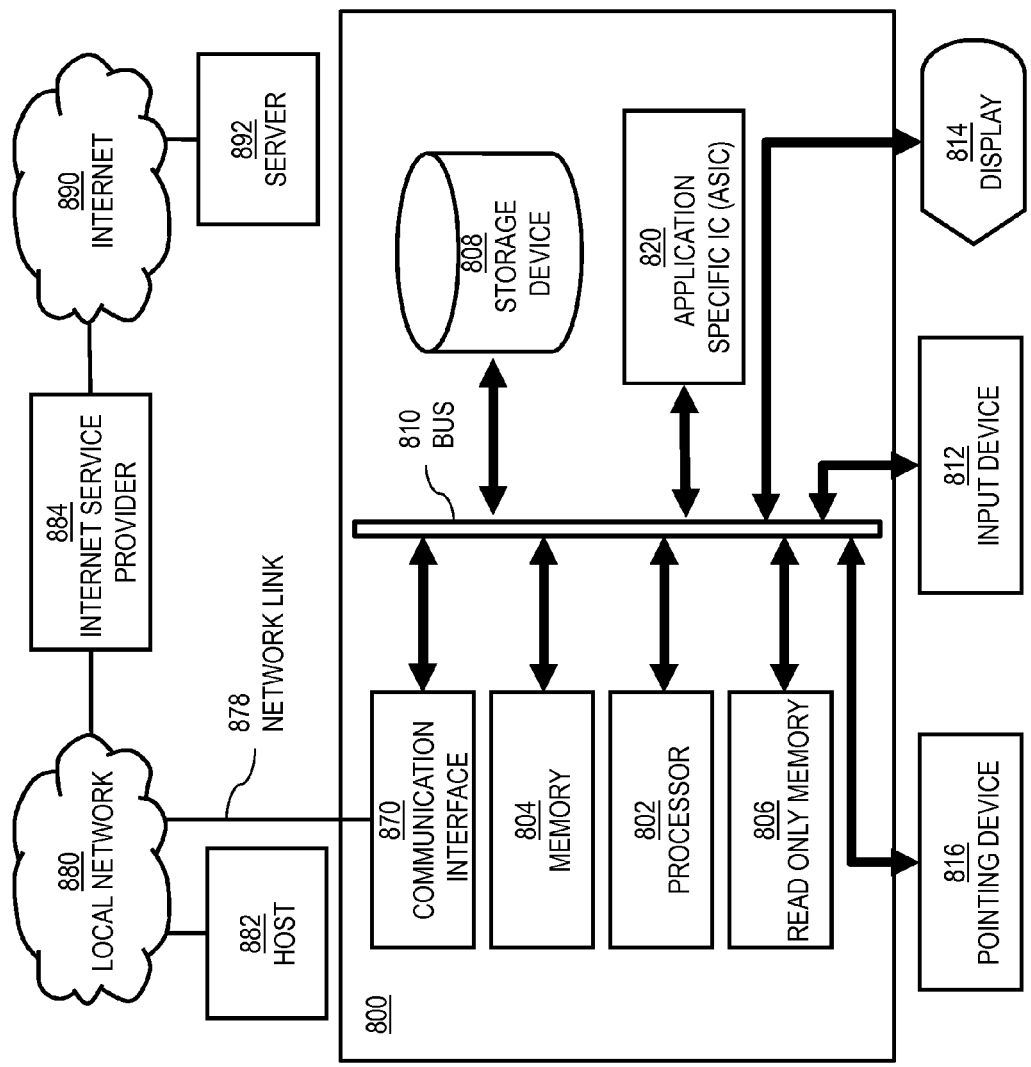
FIG. 8 is a diagram of hardware that can be used to implement an embodiment of the invention.

FIG. 8 illustrates a computer system 800 upon which an embodiment of the invention may be implemented. Computer system 800 is programmed to carry out the inventive functions described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information. The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 9:
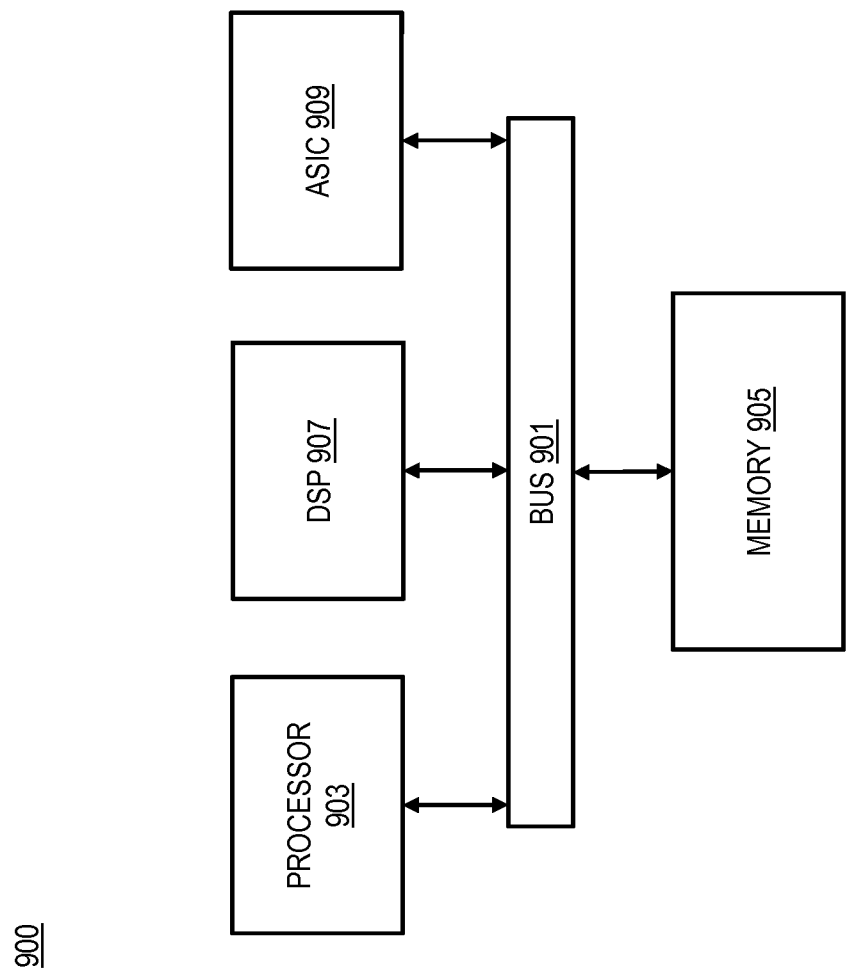
FIG. 9 is a diagram of a chip set that can be used to implement an embodiment of the invention.

FIG. 9 illustrates a chip set 900 upon which an embodiment of the invention may be implemented. Chip set 900 is programmed to carry out the inventive functions described herein and includes, for instance, the processor and memory components described with respect to FIG. 8 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-word signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein. The memory 905 also stores the data associated with or generated by the execution of the inventive steps.

Figure 10:
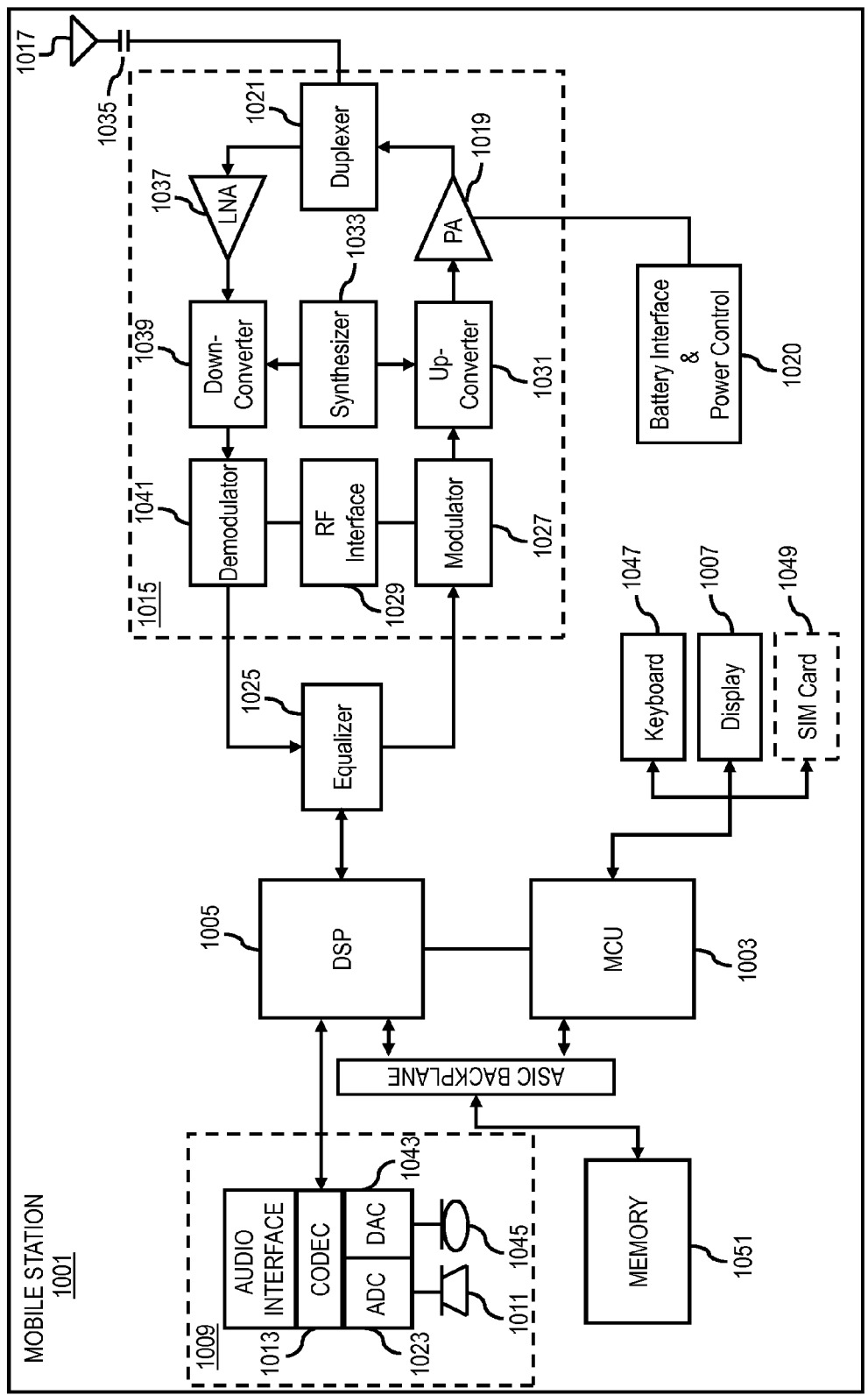
FIG. 10 is a diagram of a mobile station (e.g., handset) that can be used to implement an embodiment of the invention.

FIG. 10 is a diagram of exemplary components of a mobile station (e.g., handset) capable of operating in the system of FIG. 1, according to an exemplary embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In the exemplary embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The MCU 1003 delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A non-transitory computer-readable storage medium carrying one or more sequences of one or more instructions which, when executed by one or more processors, cause an apparatus to at least perform the following steps:
   determining that a request is received from a first service provider, the request having an associated primary token and a secondary token identifier, the secondary token identifier relating to resources of a second service provider;
   based on the secondary token identifier, identifying a secondary token; and
   causing, at least in part, an initiation of sending the secondary token to the first service provider, wherein the type of access and privileges the first service provider has in relation to the resources of the second service provider is based on the secondary token.

2. A non-transitory computer readable storage medium of claim 1, wherein, for identifying the secondary token, the apparatus is further caused, at least in part, to further perform:
   creating the secondary token based on the secondary token identifier, in response to receiving the request.

3. A non-transitory computer readable storage medium of claim 2, wherein first service provider and the second service provider belong to different trust domains.

4. A non-transitory computer readable storage medium of claim 1, wherein, for identifying the secondary token, the apparatus is further caused, at least in part, to further perform:
retrieving the secondary token from a memory store based on the secondary token identifier.

5. A non-transitory computer readable storage medium of claim 1, wherein, for identifying the secondary token, the apparatus is further caused, at least in part, to further perform:
creating an account on an authorization server associated with the primary token, wherein the first service provider authenticates and authorizes access to resources of the first service provider based on the primary token, and wherein the primary token includes a user name and password.

6. A non-transitory computer readable storage medium of claim 5, wherein, for identifying the secondary token, the apparatus is further caused, at least in part, to further perform:
creating a plurality of secondary token identifiers and respective secondary tokens, associated with the account; and
storing the plurality of secondary token identifiers in a memory store of the authorization server.

7. An apparatus comprising:
at least one processor; and
at least one memory including computer program code for one or more programs,
the at least one memory and the computer program code configured to, with the at least one processor, cause the apparatus to perform at least the following:
determine that a request is received from a first service provider, the request having an associated primary token and a secondary token identifier, the secondary token identifier relating to resources of a second service provider;
based on the secondary token identifier, identify a secondary token, wherein the type of access and privileges the first service provider has in relation to the resources of the second service provider is based on the secondary token, and
cause, at least in part, an initiation of sending the secondary token to the first service provider.

8. An apparatus of claim 7, wherein first service provider and the second service provider belong to different trust domains.

9. An apparatus of claim 7, wherein, for identifying the secondary token, the apparatus is further caused, at least in part, to:
create the secondary token based on the secondary token identifier, in response to receiving the request.

10. An apparatus of claim 7, wherein, for identifying the secondary token, the apparatus is further caused, at least in part, to:
retrieve the secondary token from a memory store based on the secondary token identifier.

11. An apparatus of claim 7, wherein, for identifying the secondary token, the apparatus is further caused, at least in part, to:
create an account on an authorization server associated with the primary token, wherein the primary token includes a user name and password.

12. An apparatus of claim 11, wherein, for identifying the secondary token, the apparatus is further caused, at least in part, to:
create a plurality of secondary token identifiers and respective secondary tokens, associated with the account; and
store the plurality of secondary token identifiers in a memory store of the authorization server.

13. A non-transitory computer-readable storage medium carrying one or more sequences of one or more instructions which, when executed by one or more processors, cause an apparatus to at least perform the following steps:
receiving at a first service provider a request relating to accessing resources of a second service provider, the request associated with a primary token;
requesting from an authorization system a secondary token, the secondary token based at least in part on the second service provider and the primary token; and
receiving the secondary token from the authorization system.

14. A non-transitory computer readable storage medium of claim 13, wherein the apparatus is further caused, at least in part, to further perform requesting from the second service provider access to the resources of the second service provider using the secondary token.

15. A non-transitory computer readable storage medium of claim 13, wherein the first service provider allows access to resources of the first service provider based on the primary token.

16. A non-transitory computer readable storage medium of claim 13, wherein the request includes the primary token.

17. A non-transitory computer readable storage medium of claim 13, wherein the first service provider and the second service provider belong to different trust domains.

18. A non-transitory computer readable storage medium of claim 13, wherein the secondary token, at least in part, identifies a scope of resources of the second service provider that the first provider is authorized to access.

19. A non-transitory computer readable storage medium of claim 13, wherein the request is received from a user device.

20. A non-transitory computer readable storage medium of claim 19, wherein the user device comprises a mobile handset.

* * * * *